United States Patent [19]

Glennon et al.

[11] Patent Number: 4,598,223
[45] Date of Patent: Jul. 1, 1986

[54] END TURN CONSTRUCTION FOR DYNAMOELECTRIC MACHINES

[75] Inventors: Timothy F. Glennon; Richard W. Reynolds, both of Rockford, Ill.

[73] Assignee: Sundstrand Corporation, Rockford, Ill.

[21] Appl. No.: 685,120

[22] Filed: Dec. 21, 1984

[51] Int. Cl.⁴ .............................................. H02K 3/46
[52] U.S. Cl. ..................................... 310/260; 310/53; 310/59; 310/208
[58] Field of Search ................ 310/260, 213, 208, 71, 310/53, 54, 57, 58, 59, 60 R, 64, 65, 261, 52, 270

[56] References Cited

U.S. PATENT DOCUMENTS

| | | | |
|---|---|---|---|
| 1,316,790 | 9/1919 | Gruber | 310/64 |
| 1,507,606 | 9/1924 | Von Kando | 310/64 |
| 3,185,872 | 5/1965 | Weissheimer | 310/213 |
| 3,495,109 | 9/1967 | Ames | 310/71 |
| 3,749,950 | 7/1973 | Lenz | 310/58 |
| 4,039,875 | 8/1977 | Morreale | 310/71 |
| 4,336,474 | 6/1982 | Davey | 310/260 |
| 4,368,399 | 1/1983 | Ying et al. | 310/260 |
| 4,513,218 | 4/1985 | Hansen | 310/208 |

FOREIGN PATENT DOCUMENTS

| | | | |
|---|---|---|---|
| 0128010 | 12/1931 | Austria | 310/260 |
| 0482506 | 9/1929 | Fed. Rep. of Germany | 310/260 |
| 1137128 | 9/1962 | Fed. Rep. of Germany | 310/213 |
| 0088045 | 4/1920 | Switzerland | 310/261 |

*Primary Examiner*—R. Skudy
*Attorney, Agent, or Firm*—Wood, Dalton, Phillips Mason & Rowe

[57] ABSTRACT

An improved end turn construction to improve cooling in a dynamoelectric machine and to axially reduce the size thereof. The machine includes a body (12) of magnetizable material having opposed ends (18) an opening (14) extending between the ends and the plurality of slots (50) about the opening (14). A rotor (16) is disposed within the opening (14) and journalled for rotation therein and electric conductors (52) are located in the slots (50) and extend to ends (54, 56) just past the ends (18) of the body (12). End turns (58, 60, 68) each interconnect a predetermined pair of the conductors (52) and extend substantially circumferntially and radially of the rotor axis with no appreciable extension axially of the axis.

1 Claim, 4 Drawing Figures

END TURN CONSTRUCTION FOR DYNAMOELECTRIC MACHINES

FIELD OF THE INVENTION

This invention relates to dynamoelectric machines, and more particularly, to a unique construction for the end turns of stator windings in such machines.

BACKGROUND OF THE INVENTION

Dynamoelectric machines, such as generators, intended for use in aerospace applications present substantial design challenges. For one, they must be lightweight to maximize the useful load carrying capacity of the vehicle in which they are employed.

For another, they must be highly efficient and reliable. The high efficiency requirement is allied to the lightweight requirement in that both objectives are achieved by maximizing the generating capacity per unit of size or weight of the generator.

One means of achieving high efficiency for a given structure is to provide for cooling of the machine. Where heat generated in the electrical generation process is carried off by a coolant, a greater amount of electrical power may be generated on a sustained basis without damaging system components than would be the case without the use of cooling systems.

As a consequence, various cooling schemes have been devised. For example, many large scale generators form windings, particularly stator windings, as conduits and actually flow coolant through the windings themselves. This approach, though successful in large generating stations, cannot be used efficiently in generators intended for aerospace use either because of size limitations or economic limitations or both.

Consequently, many cooling proposals utilize spray cooling of various components of the machines. Not infrequently, the end turns of the stator winding are sprayed with coolant emanating from fixed or movable structure forming part of the generator. This approach, while successful, is not without its difficulties. In particular, the coolant or an air/coolant mixture may tend to find its way into the air gap between the rotor and the stator to cause friction and windage losses, particularly in high speed machines.

A more efficient means of cooling is so-called "back iron" cooling by which a coolant is brought into contact with the stator magnetic material oppositely of the rotor. This approach, however, has not been useable in cooling the stator winding end turns in many instances because of the large volume occupied by such end turns, particularly in a two pole machine, which must be flooded with coolant and which thus may increase the weight of the overall system because of the extremely large volume of coolant required.

Weight concerns are also affected by the physical size of the machine. Thus, while two pole so-called "brushless generators" are generating interest in the aircraft industry because they provide a weight reduction over machines having equal generating power but of the four pole variety, there still remains room for improvement. In particular, in two pole machines, the stator winding when designed according to conventional considerations results in the end turns for such windings having considerable axial length. To accommodate such length, generator housings need be commensurately longer, thus employing a greater amount of housing material, and ultimately increasing the weight of the system over what it might be if the axial length of the end turns could be reduced.

The present invention is directed to overcoming one or more of the above difficulties.

SUMMARY OF THE INVENTION

It is the principal object of the invention to provide a new and improved dynamoelectric machine. More specifically, it is an object of the invention to provide an improved end turn construction for use in dynamoelectric machines that provides the capability for enhanced cooling and/or a reduction in the axial length of the machine.

An exemplary embodiment of the invention achieves the foregoing objection in a dynamoelectric machine including a body of magnetizable material having opposed ends, and openings extending between the ends, and a plurality of slots about the opening. A rotor is disposed within the opening and is journalled for rotation therein about an axis. Electrical conductors constituting windings for the machine are located in the slots and extend therefrom just past the ends. Electrically conductive end turns adjacent each of the ends are provided and each interconnect a predetermined pair of the conductors. The turns are provided in a configuration similar to that which would as if they were folded transversely of the conductors to be transverse to the rotational axis of the rotor and in substantial abutment with the ends of the body of magnetizable material.

Preferably, the end turns each extend substantially circumferentially and radially of the axis with no appreciable extension axially of the axis.

According to a preferred embodiment of the invention, each of the end turns is defined by two curved sections with a jog interconnecting the curved sections. One set of curved sections for the end turns is disposed in a first plane transverse to the axis and the other set of curved sections is in a second plane transverse to the axis and closely adjacent and parallel to the first plane. The jogs in the end turns extend between the plane.

The end turns may be shaped as a series of stretched, interwoven Z's, each connected at its respective end to associated ones of the corresponding pair of conductors. The tops and bases of the Z-shaped series define closely adjacent, parallel planes transverse to the rotational axis of the rotor and the end turns are concave with respect to such axis.

In a highly preferred embodiment, there is located a radially extending baffle disposed between the tops and the bases and means are provided for flowing coolant into the series in a generally radially inward direction on one side of the baffle and in a generally radially outward direction on the other side of the baffle.

The invention may be used with particular efficacy in two pole machines.

The invention as described above allows back iron cooling flow paths to be employed in cooling the end turns. The fact that the end turns are essentially folded back against the ends of the stator armature makes for an extremely axially compact machine Other objects and advantages will become apparent from the following specification taken in connection with the accompanying drawings.

DESCRIPTION OF THE PRIOR ART

Figure 1:
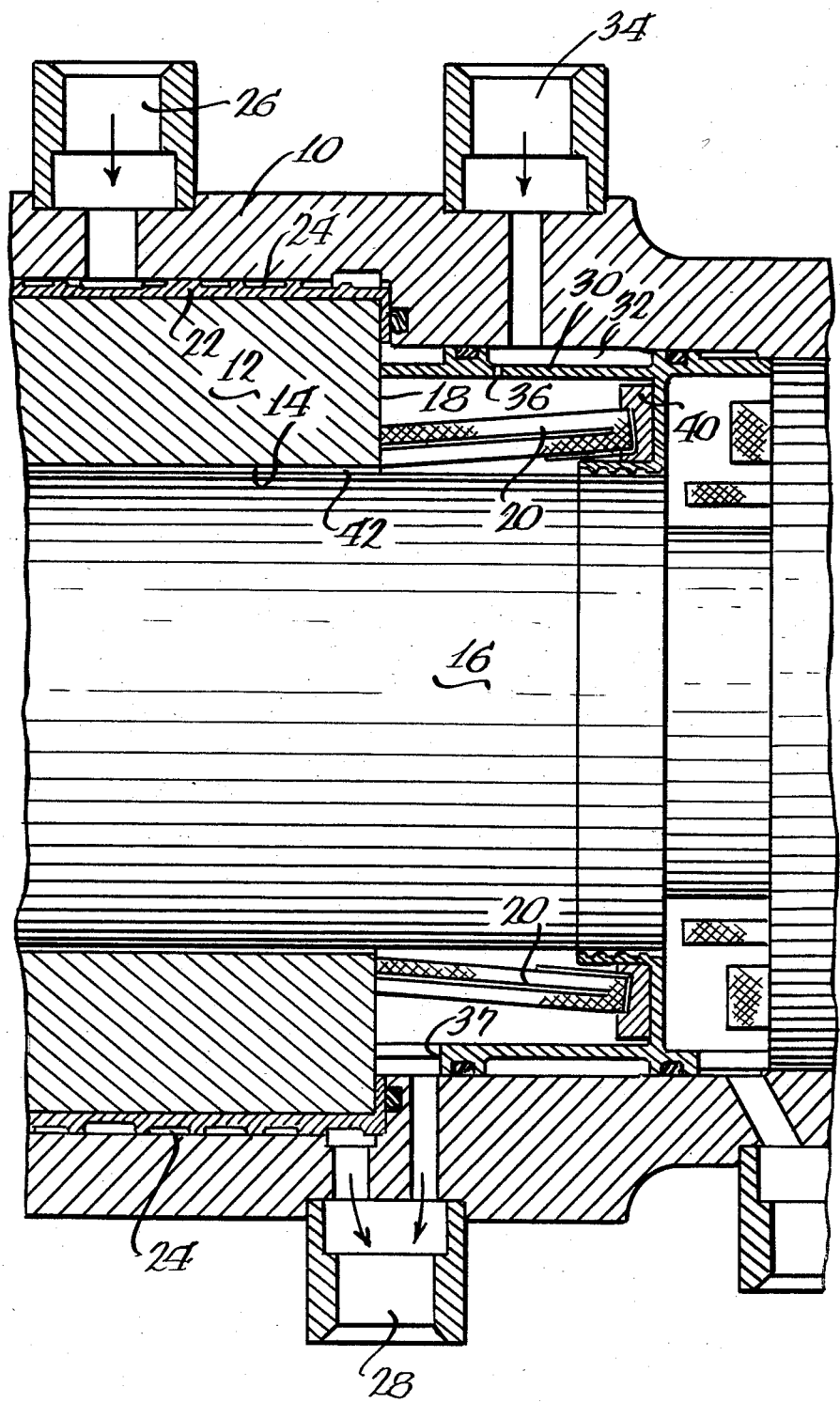
FIG. 1 is a partial sectional view of a dynamoelectric machine made according to the prior art.

A construction representative of the prior art is illustrated in FIG. 1 and is seen to include a housing 10 in which a body 12 of magnetizable material is provided. The body 12 forms a stator armature and to this end includes a central opening 14 in which a rotor 16 is rotatably disposed.

The construction has stator windings (not shown) extending through the body 12 about the opening 14 and which emerge from the ends 18 of the body to form axially elongated end turns 20.

A sleeve 22 is disposed within the housing 10 and contains the body 12. On the outer surface of the sleeve 22, the same is provided with grooves 24, typically in a spiral configuration. A coolant inlet 26 is in fluid communication with the grooves 24. A coolant, typically oil, provided from a pump (not shown) is introduced into the inlet 26 to flow about the grooves 24 and emerge from an outlet 28. This arrangement provides for so-called back iron cooling of the body 12.

Within the housing 10 a second sleeve 30 may also be disposed. The sleeve 30 includes an arcuate coolant gallery 32 on its outermost surface. A second coolant inlet 34 extends to the gallery 32 to deliver coolant thereto. A series of apertures 36 defining nozzles extend from the gallery 32 to the radially inner side of the sleeve 30 in alignment with the end turns 20. Consequently, coolant entering the gallery 32 from the inlet 34 will be sprayed by the nozzles 36 on the end turns 20 for cooling purposes.

The sleeve 30 may include an exit port 37 aligned with the outlet 28 as illustrated.

The configuration shown in FIG. 1 fairly accurately depicts the relative proportional size of the various components and note should be taken particularly of the axial length of the end turns 20 as they extend from the end 18 of the body 12 to be received in gasket 40. The gasket 40, and other means may be provided to prevent, as nearly as possible, the coolant emanating from the nozzles 36 from entering into the air gap 42 between the rotor 16 and the body 12 whereat it would cause considerable friction and windage losses.

DESCRIPTION OF THE PREFERRED EMBODIMENT

Figure 2:
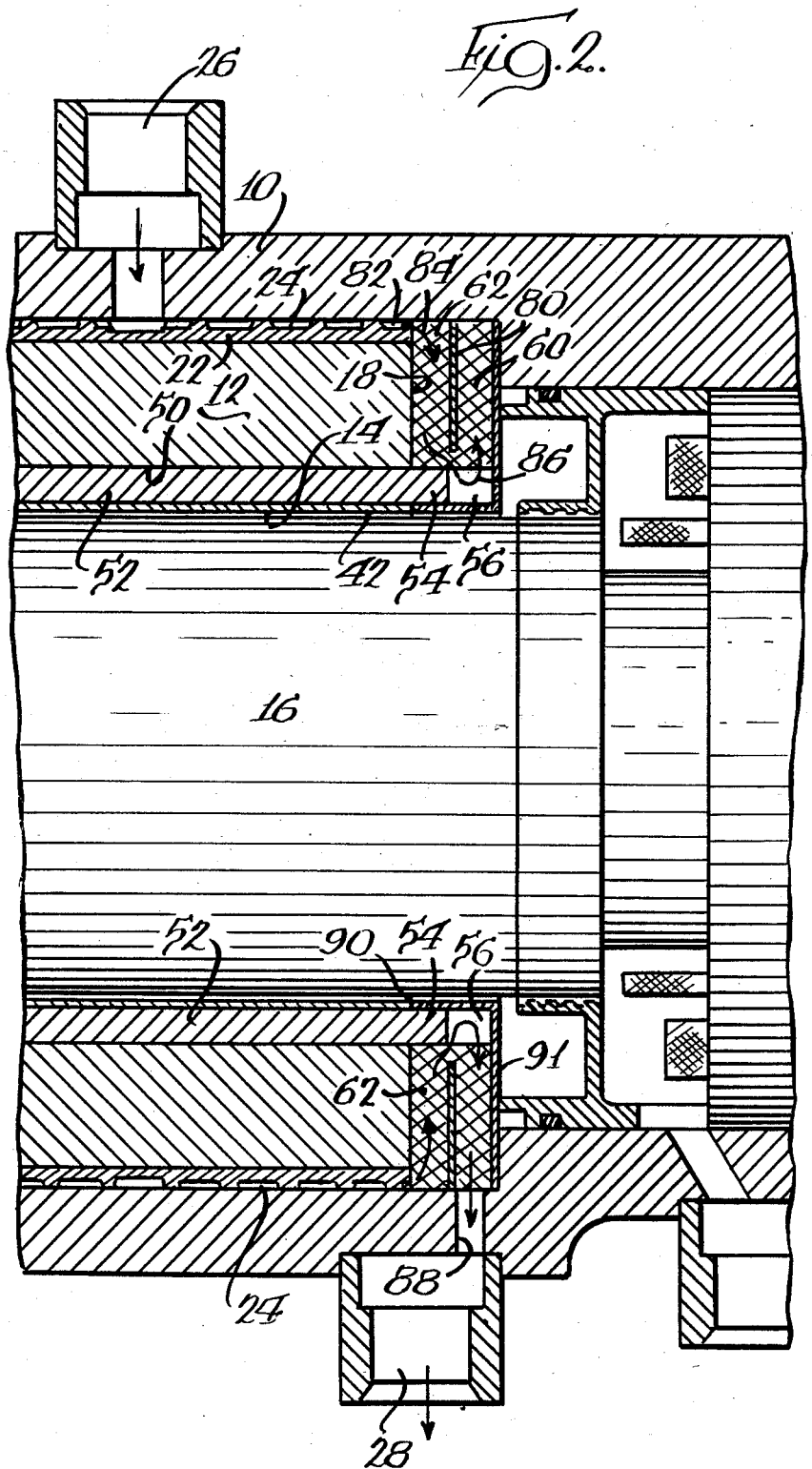
FIG. 2 is a view similar to FIG. 1 but showing a dynamoelectric machine made according to the invention.
Figure 3:
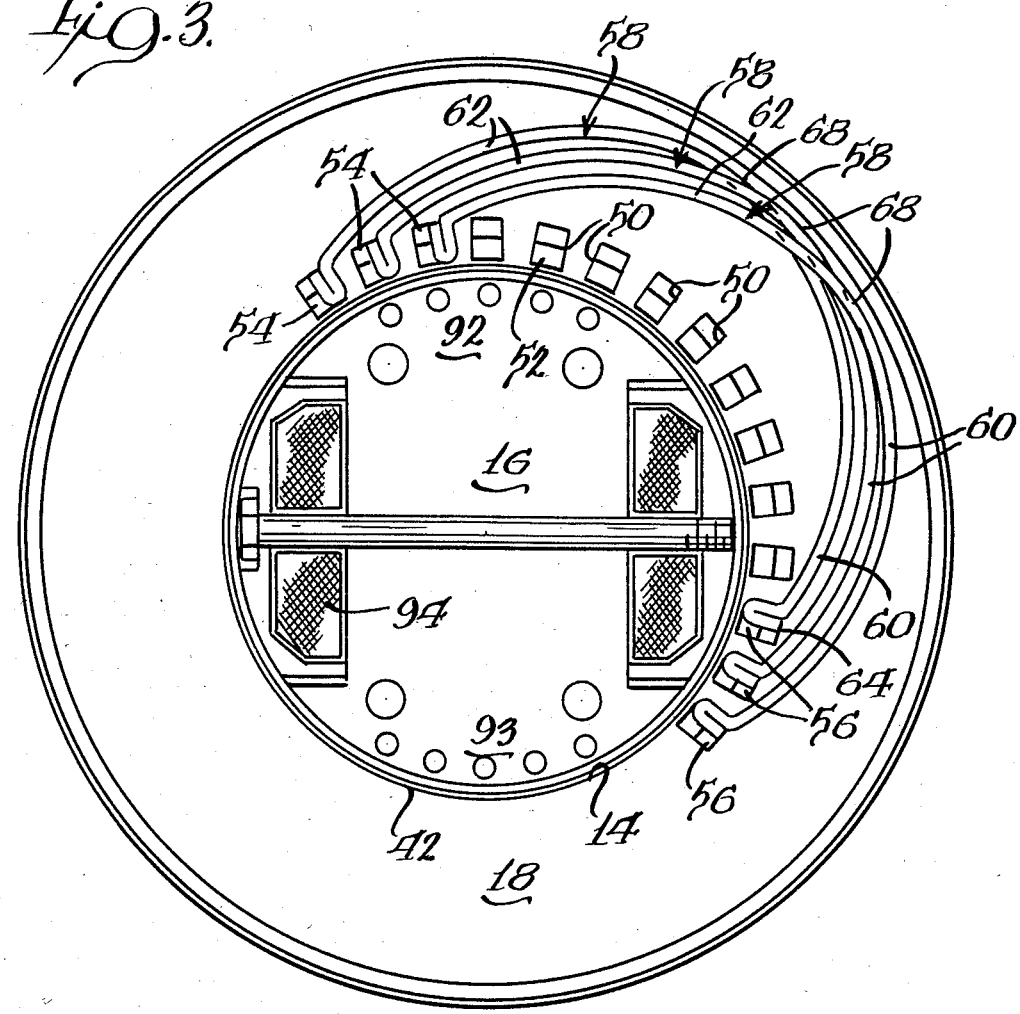
FIG. 3 is an end view with parts removed for clarity.
Figure 4:
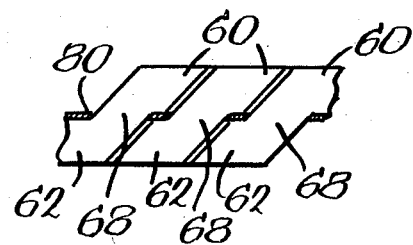
FIG. 4 is a fragmentary developed view of the end turn construction of the invention.

A preferred embodiment of a dynamoelectric machine made according to the invention is illustrated in FIGS. 2-4, inclusive. In the interest of brevity, elements employed in the invention and common to the prior art will be given the same reference numerals as those utilized previously in connection with the description of FIG. 1.

As best seen in FIGS. 2 and 3, the body 12 is provided with a plurality of slots 50 about the opening 14. The precise nature of the slots 50 can be determined through conventional considerations and each receives an electrical conductor 52 which serves as part of the stator winding of the machine. As illustrated, the conductors 52 are rectangular in cross section and those skilled in the art will readily appreciate that the same are quite stiff.

The conductors 52 extend axially outwardly of the ends 18 of the body 12. Some of the ends of the conductors 52 extend only a short distance as, for example, shown at 54 while others extend approximately twice as far as shown at 56 in FIG. 2.

End turn constructions made according to the invention interconnect pairs of the conductors 52 specifically, connect one of the ends 54 with one of the ends 56. The end turn constructions are generally designated 58 and three of the same are shown in FIGS. 3 and 4 although a greater number will be employed, the ultimate number depending upon the number of pairs of conductors 52 to be interconnected. As can be seen in FIG. 3, each of the end turn constructions 58 is comprised of two curved sections 60 and 62 which both radially and circumferentially. Each curved 60 terminates, at one end, with a connection 64 formed as by brazing to one of the conductor ends 56 while curved section 62 makes a similar connection to a conductor end 54. Intermediate their ends, and at their radially outwardmost location, each of end turn constructions 58 includes a jog 68 interconnects the curved sections 60 and 62 as illustrated in FIG. 4.

As can be ascertained from FIG. 2, the curved sections 62 of each of the end turn constructions 58 are coplanar, lying in a plane transverse to the rotational axis of the rotor 16 and in virtual abutment with the end 18 of the body 12. At the same time, each of the curved sections 60 of each of the end turn constructions 58 lie in a similar plane transverse to the rotational axis 16, and parallel to the first mentioned plane and closely adjacent thereto. In order to maintain this planar configuration and yet establish a circuit between the curved sections 60 and 62, the jogs 68 are provided and, as mentioned, located at the radially outwardmost location of each end turn construction 58. Because, as seen in FIG. 3, each end turn construction 58. Because, as angularly staggered with respect to the remainder, the location of the jog 68 is likewise staggered as shown in FIG. 4 enabling, as considered in a clockwise direction as viewed in FIG. 3, each successive curved portion 62 of each successive end turn construction 58 to underlie, typically in spaced relation, the preceding curved section 62 and emerge at its radially outermost point at the absence of material created by the presence of the jog 68 in the immediately preceding end turn construction 58. Similarly, each curved section 60 will underlie the curved section 60 of the immediately successive end turn construction 58 in a spaced relation. The overall configuration or shape is one of a series of stretched, interwoven Z's, each connected at its respective ends to associated ones of the corresponding pair of conductors 54. As viewed in FIG. 4, the tops of the Z's appear as the curved portions 60 while the bases of the Z's appear as the curved portions 62 and the same are, of course, concave with respect to the rotational axis of the rotor 16.

Desirably, a baffle 80 may be disposed between the curved section 60 on the one hand and the curved sections 62 on the other to extend generally radially inwardly as shown in FIG. 2 (the baffle 80 is omitted from FIG. 3 for clarity). The space containing the end turn constructions 58 is in fluid communication with the endmost convolution 82 of the groove 24 and as a consequence, coolant will flow therefrom in the direction of an arrow 84 into the spaces between the curved sections 62. The presence of the baffle forces the flow to be generally radially inwardly (it will have a sizable circumferential directional component of flow as well) until it reaches the radially inner edge 86 of the baffle 80. At this point, the coolant flow will pass under the baffle and into the area occupied by the curved sections 60 to flow radially outwardly, also with a sizable circumferential component. The housing 10 is provided with a port 88 aligned with the plane containing the curved section 60 which is connected to the outlet 28.

To prevent coolant from entering the air gap 42, a sleeve-like seal 90 having a radially outwardly directed flange 91 may be utilized to house the end turns.

As mentioned previously, the invention is ideally suited for use in two pole machines. Thus, in FIG. 3, the rotor 16 is illustrated as being of a two pole construction including a first pole 92 and a second pole 93 and provided with the usual windings 94.

Though not shown in the drawing, the construction of the invention is preferably employed at both ends of the body 12 and as can be seen from a comparison of FIGS. 1 and 2, there is a substantial decrease in the axial extent of the end turn constructions 58 made according to the invention as against conventional end turns shown at 20 in FIG. 1.

In fact, it will be appreciated that the invention provides an end turn construction with no appreciable axial extent, it being basically equal to slightly more than twice the thickness of the conductors employed in forming the end turn constructions 58.

Consequently, the overall construction is much more compact. This in turn eliminates a significant amount of housing and rotor material and provides a corresponding weight savings. It will also be appreciated that rotor journal bearings (not shown) may be spaced a lesser distance if desired which may improve mechanical stability of the system, particularly where the machine is a high speed machine. In this respect, it is noted that two pole generators intended for use in aircraft would employ rotor speeds of 24,000 RPM.

It will be further appreciated that the end turn constructions 58 could be packaged in a manner somewhat akin to a printed circuit board facilitating easy assembly. Specifically, the connections 64 could be formed, for example, by coating the surfaces of the conductors 52 and/or the end turn assemblies 58 with solder or braze material and then placing a voltage across the terminals. The initial higher resistance of the joints would cause local heating resulting in the solder or braze material fusing to the components and forming a good electrical connection. Consequently, the invention provides the potential for less costly assembly.

It will also be recognized that enhanced end turn cooling can be expected from the invention. Specifically, coolant may flow through the spaces between the adjacent end turn assemblies 58 contacting both wide sides of the rectangular cross section material used for such assemblies whereas, in the prior art construction, only one side of the end turn is contacted by coolant. Thus, with improved cooling efficiency, for a given unit of weight, a higher generating capacity can result.

We claim:

1. A dynamoelectric machine comprising:

a body of magnetizable material having opposed ends, an opening extending between said ends and plurality of slots about the opening;

a rotor within said opening and journalled for rotation therein about an axis;

electrical conductors constituting windings for said machine and located in said slots and extending therefrom just past said ends;

electrical conductive end turns adjacent each of said ends, each interconnecting a predetermined pair of said conductors, said end turns being shaped as a series of stretched, interwoven "Z's" each connected at its respective ends to said electrical an associated one of a corresponding pair of conductors, tops and bases of said Z shaped series defining closely adjacent, parallel planes transverse to said axis and being concave with respect to said axis;

a radially extending baffle disposed between said tops and said bases; and means for flowing coolant into said series in a generally radially inward direction on one side of said baffle and in a generally radially outward direction on another side of said baffle.

* * * * *